United States Patent
Miyano

(10) Patent No.: US 8,715,604 B2
(45) Date of Patent: May 6, 2014

(54) METHOD FOR PRODUCTION OF SILICON CARBIDE POWDER

(75) Inventor: Mari Miyano, Nishitokyo (JP)

(73) Assignee: Bridgestone Corporation, Tokyo (JP)

( * ) Notice: Subject to any disclaimer, the term of this patent is extended or adjusted under 35 U.S.C. 154(b) by 317 days.

(21) Appl. No.: 12/676,558

(22) PCT Filed: Sep. 5, 2008

(86) PCT No.: PCT/JP2008/066055
§ 371 (c)(1),
(2), (4) Date: May 19, 2010

(87) PCT Pub. No.: WO2009/031641
PCT Pub. Date: Mar. 12, 2009

(65) Prior Publication Data
US 2010/0254877 A1 Oct. 7, 2010

(30) Foreign Application Priority Data
Sep. 6, 2007 (JP) .................... 2007-231749

(51) Int. Cl.
*C01B 31/36* (2006.01)
*C01B 21/068* (2006.01)
*C01B 33/06* (2006.01)

(52) U.S. Cl.
USPC .......................... 423/345; 423/344

(58) Field of Classification Search
None
See application file for complete search history.

(56) References Cited

U.S. PATENT DOCUMENTS

| | | | | |
|---|---|---|---|---|
| 4,865,806 A | * | 9/1989 | Skibo et al. | 420/129 |
| 5,079,195 A | * | 1/1992 | Chiang et al. | 501/92 |
| 5,863,325 A | | 1/1999 | Kanemoto et al. | |
| 6,395,203 B1 | * | 5/2002 | Brun | 264/29.1 |
| 6,632,761 B1 | * | 10/2003 | Ushita et al. | 501/88 |
| 2002/0189536 A1 | | 12/2002 | Otsuki et al. | |
| 2005/0079359 A1 | | 4/2005 | Fujita et al. | |
| 2010/0209328 A1 | * | 8/2010 | Bi et al. | 423/344 |
| 2012/0244060 A9 | * | 9/2012 | Bi et al. | 423/344 |

FOREIGN PATENT DOCUMENTS

| | | | |
|---|---|---|---|
| EP | 0 052 487 A1 | | 5/1982 |
| JP | 9-48605 A | | 2/1997 |
| JP | 09048605 A | * | 2/1997 |
| JP | 9-208210 A | | 8/1997 |
| JP | 11-079840 A | | 3/1999 |

OTHER PUBLICATIONS

Narisa et al.; Synthesis of Ultrafine SiC Powders from Carbon-Silica Hybridized Precursors with Carbothermic Reduction; Journal of Sol-Gel Science Technology; 12, 145-152; 1998.*

* cited by examiner

*Primary Examiner* — Guinever Gregorio
(74) *Attorney, Agent, or Firm* — Sughrue Mion, PLLC

(57) ABSTRACT

A liquid mixture is prepared by using a liquid phenolic resin (PL-2818) serving as a carbon source. While an inert gas is introduced into the liquid mixture, a released gas is discharged. Then, the liquid mixture is dried in a reduced-pressure atmosphere, and thereby the nitrogen dissolved in the liquid mixture can be reduced. In this way, the amount of nitrogen content after burning can be reduced.

2 Claims, 2 Drawing Sheets

| | AMOUNT OF NITROGEN CONTENT [ppm] | YIELD [%] |
|---|---|---|
| EXAMPLE 1 | 3.1 | 62 |
| EXAMPLE 2 | 27.3 | — |
| EXAMPLE 3 | 10.8 | 58 |
| COMPARATIVE EXAMPLE 1 | 500 | — |

FIG. 2

|  | AMOUNT OF NITROGEN CONTENT [ppm] | YIELD [%] |
|---|---|---|
| EXAMPLE 1 | 3.1 | 62 |
| EXAMPLE 2 | 27.3 | — |
| EXAMPLE 3 | 10.8 | 58 |
| COMPARATIVE EXAMPLE 1 | 500 | — |

METHOD FOR PRODUCTION OF SILICON CARBIDE POWDER

TECHNICAL FIELD

The present invention relates to a method for production of silicon carbide powder favorably applied to a process of producing a silicon carbide single crystal.

BACKGROUND ART

Conventionally, silicon carbide powder is produced in the following processes. Specifically, (1) A liquid mixture containing a silicon source, a carbon source, and a polymerizing or cross-linking catalyst is dried, and thereby a solid of the liquid mixture is produced. (2) The solid produced in the process (1) is carbonized in an argon atmosphere, and thereby preliminarily burnt powder is produced. (3) The preliminarily burnt powder is burned in an argon atmosphere, and thereby silicon carbide powder is produced.

DISCLOSURE OF THE INVENTION

In the conventional method for production of silicon carbide powder, a phenolic resin synthesized using an amine-based catalyst is employed as the carbon source. For this reason, according to the conventional method for production of silicon carbide powder, a nitrogen component derived from the amine-based catalyst is inevitably mixed in the silicon carbide powder. Therefore, it is difficult to reduce the amount of nitrogen content in the silicon carbide powder down to 100 ppm or lower.

The present invention has been made to solve the above-described problem, and an object thereof is to provide a method for production of silicon carbide powder capable of reducing the amount of nitrogen content in the silicon carbide after burning.

The method for production of silicon carbide powder according to the present invention includes a first step, a second step, and a third step.

In the first step, a liquid mixture including a silicon source, a carbon source containing no amine, and a polymerizing or cross-linking catalyst is held in a container. In this state, an inert gas is introduced into the liquid mixture held in the container. By the introduction of the inert gas, a released gas is discharged out of the container.

In the second step, the container that holds the liquid mixture is placed in a drying chamber. Then, the internal pressure of the container is reduced. This makes the liquid mixture dried, and thereby a solid of the liquid mixture is produced.

In the third step, the solid produced in the second step is burned in a heating furnace, and thereby silicon carbide powder is produced.

In the method for production of silicon carbide powder according to the present invention, a carbon source containing no amine is employed as a raw material for the production of the liquid mixture. An inert gas is introduced into the produced liquid mixture in a reduced-pressure atmosphere. A gas released by the introduction of the inert gas is discharged out of the container.

In this way, the nitrogen dissolved in the liquid mixture can be reduced. So, according to the method for production of silicon carbide powder of the present invention, the amount of nitrogen content after burning can be reduced.

BRIEF DESCRIPTION OF THE DRAWINGS

FIG. 2 is a chart listing the amount of nitrogen content in each of the silicon carbide powders produced by the production method of the present invention and by the conventional production method.

BEST MODES FOR CARRYING OUT THE INVENTION

Figure 1:
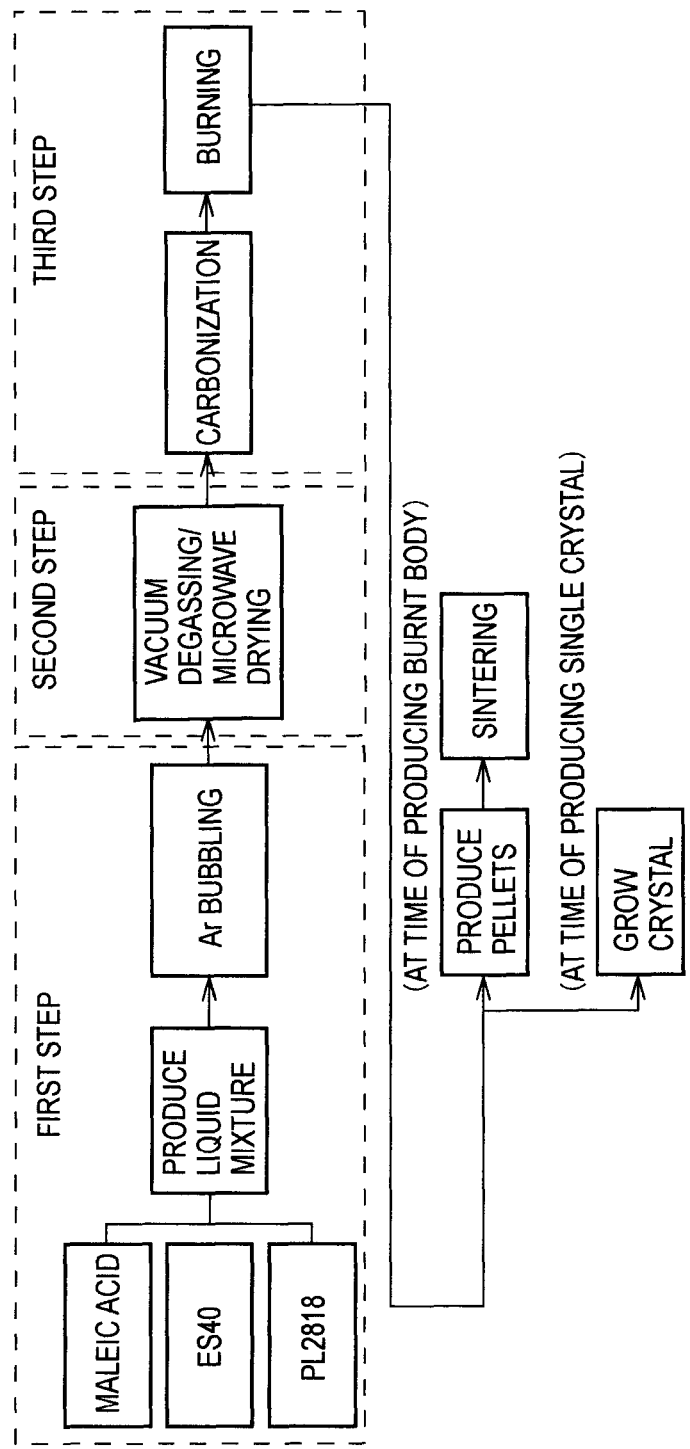
FIG. 1 is a flowchart illustrating a method for production of silicon carbide powder that is provided as an embodiment of the present invention.

Hereinafter, with reference to the drawings, a method for production of silicon carbide powder according to an embodiment of the present invention will be described by using FIG. 1.

In a first step of the method for production of the silicon carbide powder, a liquid mixture is produced by mixing together Ethyl Silicate 40 (ES40) serving as a silicon source, a liquid phenolic resin (PL-2818) serving as a carbon source, and a maleic acid serving as a polymerizing or cross-linking catalyst. The liquid mixture thus produced is put inside a container, and then the container is placed in a reduced-pressure atmosphere.

The phenolic resin (PL-2818) is synthesized using no amine-based catalyst. So, the phenolic resin (PL-2818) contains no nitrogen atom (amine). Accordingly, the amount of nitrogen content in the liquid mixture is significantly small, as compared with the case where a phenolic resin synthesized using an amine-based catalyst is employed as a carbon source.

In addition, in the first step, an inert gas such as argon gas is introduced into the liquid mixture in the container by bubbling. A gas is released by the introduction of the inert gas, and the gas is discharged out of the container. In the first step, the nitrogen in the liquid mixture is substituted with the inert gas components, and is discharged as a discharge gas.

In the following second step, the internal pressure of the container that is placed in a drying chamber is reduced. In the drying chamber, the liquid mixture is irradiated with microwaves (electromagnetic wave) to dry the liquid mixture, and thereby a solid of the liquid mixture is produced. In other words, a vacuum degassing is performed on the liquid mixture. Accordingly, the amount of nitrogen content in the liquid mixture can be reduced further.

In the third step, the solid produced in the second step is placed in a crucible installed in a heating furnace. The solid is carbonated at approximately 900° C. in an atmosphere of inert gas atmosphere other than nitrogen, and thereby a preliminarily burnt powder is produced. The preliminarily burnt powder is further burned at approximately 1900° C. in an inert gas atmosphere, and thereby silicon carbide powder is produced.

Subsequently, the silicon carbide powder and a liquid phenolic resin are mixed together to produce pellets. The pellets thus produced are sintered in a non-oxidizing atmosphere such as in an inert gas atmosphere, and thereby a silicon carbide sintered body is obtained. Then, a silicon carbide single crystal is produced by making a crystal of silicon carbide grow using the silicon carbide powder.

As clear from the above description, in the method for production of silicon carbide powder that is provided as an embodiment of the present invention, a liquid mixture is produced using a liquid phenolic resin (PL-2818) as a carbon source. An inert gas is introduced into the produced liquid mixture by bubbling. Gas is released by the introduction of the inert gas, and the released gas is discharged out of the container. In this way the nitrogen dissolved in the liquid mixture is reduced.

Here, the furnace materials, such as a heat-insulating material forming the heating furnace and the crucible, are subjected beforehand to a purification process in a halogen gas. This process helps to reduce the amount of nitrogen atoms contained, as impurities, in the silicon carbide powder.

In addition, in the step of the carbonizing the solid (i.e., the third step), it is preferable to use furnace materials made of quartz rather than use furnace materials made of carbon. Additionally, it is preferable to introduce an inert gas when the heating furnace is opened. Moreover, it is preferable that the inert gas should be subjected to a purification process. These additional processes help to reduce the amount of nitrogen atoms contained, as impurities, in the silicon carbide powder.

EXAMPLES

Silicon carbide powders were produced using different carbon sources. The amounts of nitrogen content in the produced silicon carbide powders were compared with each other. The results are shown in FIG. 2.

In Example 1, a liquid phenolic-based resin (PL-2818) was employed as the carbon source.

In Example 2, a particulate phenolic-based resin (Highly functional particulate phenolic resin "Bellpearl" (manufactured by Air Water Inc.)) was employed as the carbon source.

In Example 3, a xylene-based resin (Resol-type xylene resin "Nikanol PR-1440M" (manufactured by Mitsubishi Gas Chemical Company Inc.)) was employed as the carbon source.

In Comparative Example 1, a phenolic resin synthesized using an amine-based catalyst was employed as the carbon source.

The amount of nitrogen content in each silicon carbide powder was measured by an oxygen-nitrogen simultaneous measurement apparatus TC-600 (manufactured by LECO Corporation).

As FIG. 2 shows, when a phenolic-based resin synthesized using no amine-based catalyst is employed as the carbon source, the amount of nitrogen content in the silicon carbide powder can be reduced significantly. Note that, from the results shown in FIG. 2, it is found that in both the case where a phenolic-based resin synthesized using no amine-based catalyst is employed as the carbon source and the case where a xylene resin synthesized using no amine-based catalyst is employed as the carbon source, an effect for reducing the amount of nitrogen in the silicon carbide powder is high.

In view of the yield of the silicon carbide powder, the use of the phenolic-based resin is more preferable than the use of the xylene resin.

As shown in FIG. 2, the silicon carbide powders produced by the method for production of silicon carbide powder according to the embodiment can reduce the amount of nitrogen content after the burning, as compared with the case of the silicon carbide powders produced by the conventional production method.

The embodiment of the present invention has been described above; however, the present invention is not limited to the description and the drawings constituting a part of the disclosure of the present invention according to the embodiment. In other words, it is a matter of course that all the other embodiments, examples, and operational techniques and the like to be made by those skilled in the art on the basis of the above-described embodiment are included in the scope of the present invention.

The entire contents of the Japanese Patent Application No. 2007-231749 (filed on Sep. 6, 2007) are incorporated by reference in the description of the present application.

INDUSTRIAL APPLICABILITY

According to the method for production of silicon carbide powder of the present invention, the amount of nitrogen content after the burning can be reduced. For this reason, the present invention is useful when applied to silicon carbide single crystal wafer of high purity.

The invention claimed is:

1. A method for production of silicon carbide powder comprising:
a first step of
putting a liquid mixture including a silicon source, a carbon source containing no amine, and a polymerizing or cross-linking catalyst inside a container,
introducing an argon gas into the liquid mixture contained in the container, and discharging a released gas out of the container;
a second step of
placing the container in which the liquid mixture is placed in a drying chamber, and reducing the internal pressure of the container, and
producing a solid of the liquid mixture by drying the liquid mixture in the drying chamber, and
a third step of
placing the produced solid in a heating furnace, and producing silicon carbide powder by carbonating the solid in the heating furnace,
wherein the carbon source containing no amine is a phenolic resin synthesized without using an amine-based catalyst.

2. The method for production of silicon carbide powder according to claim 1 wherein
a furnace material of the heating furnace is subjected beforehand to a purification process performed in a halogen gas.

* * * * *